US006640259B2

(12) United States Patent
Nakamoto et al.

(10) Patent No.: US 6,640,259 B2
(45) Date of Patent: Oct. 28, 2003

(54) VEHICLE-MOUNTED ELECTRONIC CONTROL APPARATUS

(75) Inventors: Katsuya Nakamoto, Tokyo (JP); Mitsuhiro Kitta, Tokyo (JP); Kohji Hashimoto, Tokyo (JP); Hiroshi Gokan, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 392 days.

(21) Appl. No.: 09/813,947

(22) Filed: Mar. 22, 2001

(65) Prior Publication Data

US 2002/0035650 A1 Mar. 21, 2002

(30) Foreign Application Priority Data

Sep. 19, 2000 (JP) ....................................... 2000-283080

(51) Int. Cl.[7] .................................................. G06F 3/00

(52) U.S. Cl. ............................. 710/5; 710/36; 710/105; 712/225; 709/201

(58) Field of Search ............................ 710/1, 5, 18, 29, 710/33, 36, 105, 100; 712/225, 10, 32, 245; 709/200, 201, 205

(56) References Cited

U.S. PATENT DOCUMENTS

| | | | | | |
|---|---|---|---|---|---|
| 4,697,092 | A | * | 9/1987 | Roggendorf et al. | 307/10 R |
| 5,159,990 | A | * | 11/1992 | Abe et al. | 180/197 |
| 5,453,736 | A | * | 9/1995 | Noren | 340/825.22 |
| 5,696,677 | A | * | 12/1997 | Leaphart et al. | 701/37 |
| 5,740,040 | A | * | 4/1998 | Kifuku et al. | 701/41 |
| 6,035,825 | A | * | 3/2000 | Worth et al. | 123/357 |
| 6,427,108 | B1 | * | 7/2002 | Kanasugi et al. | 701/51 |

FOREIGN PATENT DOCUMENTS

| | | | |
|---|---|---|---|
| JP | 63-223901 | 9/1988 | G05B/15/02 |
| JP | 5-119811 | 5/1993 | G05B/19/05 |
| JP | 7-13912 | 1/1995 | G06F/13/12 |
| JP | 7-334476 | 12/1995 | G06F/15/177 |
| JP | 8-305681 | 11/1996 | G06F/15/78 |
| JP | 9-83301 | 3/1997 | H03H/19/00 |
| JP | 2000-68833 | 3/2000 | H03M/1/12 |
| JP | 2000-89974 | 3/2000 | G06F/11/00 |

* cited by examiner

*Primary Examiner*—Kim Huynh
*Assistant Examiner*—Rijue Mai
(74) *Attorney, Agent, or Firm*—Sughrue Mion, PLLC

(57) ABSTRACT

A vehicle-mounted electronic control apparatus comprises:

a main CPU including a first nonvolatile memory in which at least control programs and control constants, in correspondence with types of controlled vehicles, transmitted from an external tool are written, the main CPU including a first RAM for calculation processing;

a sub CPU including a second nonvolatile memory in which programs for input/output processing are written and a second RAM for calculation processing; and a serial-parallel converter for serial communication adapted to transmit a plurality of input signals, which are input to the sub CPU, to the main CPU, wherein a plurality of filter constants corresponding to the plurality of input signals are stored in at least one of the first and second nonvolatile memory; and the sub CPU has a digital filter section adapted to perform predetermined calculation based on the filter constants to transmit a result of the calculation to the main CPU.

10 Claims, 8 Drawing Sheets

VEHICLE-MOUNTED ELECTRONIC CONTROL APPARATUS

BACKGROUND OF THE INVENTION

1. Field of the Invention

This invention relates to, for example, an electronic control apparatus into which a microprocessor used for fuel supply control of an engine for automobile is built, and particularly to a vehicle-mounted electronic control apparatus improved so as to standardize the apparatus in relation to control of various vehicles while miniaturizing the apparatus by improving handling of multiple input/output signals.

2. Description of the Related Art

FIG. 7 shows a typical block circuit diagram in a conventional electronic control apparatus of this kind, and an ECU (engine control unit) 1 formed of one printed board mainly comprises a large LSI (integrated circuit parts) 2, and the LSI 2 is formed by connecting a CPU (microprocessor) 3, nonvolatile flash memory 4, RAM 5, a data selector 6 for input, an A/D converter 7, output latch memory 8, etc. through a data bus 30.

The ECU 1 operates by receiving supply of a control power from a power unit 9 to which a power is supplied from a vehicle-mounted battery 10 through a power line 11 and a power switch 12, and execution programs for the above described or control constants for engine control are previously stored in the nonvolatile flash memory 4.

On the other hand, multiple on-off input signals from various sensor switches 13 are supplied from a bleeder resistor 14 acting as a pull-up or pull-down resistor to a comparator 19 through a series resistor 15 and a parallel capacitor 16 constructing a noise filter. An input resistor 17 and a positive feedback resistor 18 are connected to the comparator 19 and when a voltage applied to both ends of the parallel capacitor 16 exceeds a reference voltage applied to a negative side terminal of the comparator 19, a signal of logic “H” is supplied to the data selector 6.

However, when the voltage applied to both ends of the parallel capacitor 16 drops, input by the positive feedback resistor 18 is added, so that the voltage drops to a voltage lower than the reference voltage, and whereby an output of the comparator 19 returns to logic “L”.

In this manner, the comparator 19 acts as a comparator for level decision including a hysteresis function, and it is constructed so that outputs of multiple comparators 19 are stored in the RAM 5 through the data selector 6 and the data bus 30.

Incidentally, the data selector 6 handles, for example, an input of 16 bits and produces an output to the data bus 30 when a chip select signal is received from the CPU 3. The number of inputs extends to several tens and a plurality of the data selectors are used.

Also, multiple analog signals from various analog sensors 20 are supplied to the A/D converter 7 through a series resistor 21 and a parallel capacitor 22 constructing a noise filter, and digital outputs of the A/D converters receiving a chip select signal from the CPU 3 are stored in the RAM 5 through the data bus 30.

A control output of the CPU 3 is stored in the latch memory 8 through the data bus 30 and drives an external load 26 through an output transistor 23, and a plurality of the latch memory are used to cope with a number of control outputs and it is constructed so that the control output is stored to the latch memory chip-selected by the CPU 3.

Incidentally, numeral 24 denotes a base resistor for driving of the transistor 23, and numeral 25 denotes a ballast resistor connected between a base and an emitter of the transistor 23, and numeral 27 denotes a power relay for feed to the external load 26.

In the conventional apparatus constructed in this manner, there were problems in that a scale of the LSI 2 becomes large since the CPU 3 handles extremely multiple inputs/outputs and capacitors with various capacities need to be used in the parallel capacitors 16, 22 acting as the noise filters in order to ensure an intended filter constant and thus standardization is difficult and large capacitors need to be used in order to ensure a large filter constant, and thus the ECU 1 becomes large-scale.

As means for reducing input/output terminals of the LSI 2 to do miniaturization, as shown in “input/output processing IC” disclosed in JP-A-7-13912, a method of communicating multiple input/output signals in a time sharing manner using serial communication blocks is proposed.

However, in this method, there are problems in that noise filters with various capacities are necessary and it is not suitable for standardization of an apparatus and also a capacitor with a large capacity is required in order to ensure a sufficient filter constant and it is also not suitable for miniaturization of the apparatus.

On the other hand, a concept of using a digital filter as the noise filter to the on-off input signals to control the filter constant by a microprocessor is publicly known.

For example, in “programmable controller” disclosed in JP-A-5-119811, there is provided a filter constant change instruction capable of changing a sampling cycle while adopting an input logical value to store the value in input image memory when the input logical values of an external input signal sampled are the same value continuously by plural times.

Though this method is characterized in that the filter constant can freely be changed, in the case of handling multiple input signals, there is a problem in that a load of the microprocessor increases and control response, which is the primary purpose of the microprocessor, decreases.

In addition, as the digital filter to the on-off input signals, as shown in “data storage control apparatus” disclosed in JP-A-2000-89974, there is also means constructed so as to provide a shift register as hardware and perform sampling processing in a manner similar to the concept.

Also, in “switched capacitor filter” disclosed in JP-A-9-83301, a digital filter using a switched capacitor filter is indicated as a noise filter to analog input signals of multichannel.

Also in this case, there is a problem in that a load of the microprocessor increases and control response, which is the primary purpose of the microprocessor, further becomes less in the case of handling multiple analog input signals.

In addition, means constructed so as to switch resistance of an analog filter by resistor/capacitor in a multistage manner and change a filter constant is indicated in “microcomputer” disclosed in JP-A-8-305681, or a digital filter of a moving average method for handling an arithmetic average value of plural time series sampling data as data of current time after converting an analog value into a digital value is indicated in “digital filter method” disclosed in JP-A-2000-68833.

Moreover, there are the following public examples in relation to writing of programs or transfer processing associated with the invention.

Means for providing a main CPU and a sub CPU, and transferring program data of the sub CPU from ROM of the main CPU to RAM of the sub CPU and eliminating ROM of the sub CPU is proposed in "program transfer apparatus" disclosed in JP-A-7-334476.

Also, a transfer writing control method of a microprocessor for vehicle-mounted control apparatus for providing ROM capable of writing and erasing of program data by transfer of program data to be switched from the outside is proposed in "vehicle-mounted control apparatus" disclosed in JP-A-63-223901.

The related arts described above are partial miniaturization and standardization arts, and the fact that full-dress miniaturization and standardization into which these arts are integrated are not performed has been already described.

Particularly, there was a problem in that a decrease in control ability and response, which is the primary purpose of a microprocessor, cannot be avoided in order to achieve the miniaturization and standardization of input/output circuit parts of the microprocessor.

SUMMARY OF THE INVENTION

A first object of the invention is to achieve miniaturization and standardization of the whole control apparatus by miniaturizing input filter parts while reducing a load of a microprocessor associated with input/output processing to enhance the primary control ability and response by improving problems described above.

A second object of the invention is to standardize hardware more effectively and easily by changing control programs or control constants in correspondence with various vehicles with different control specifications.

A vehicle-mounted electronic control apparatus according to the invention comprises:

a main CPU including a first nonvolatile memory in which at least control programs and control constants, in correspondence with types of controlled vehicles, transmitted from an external tool are written, the main CPU including a first RAM for calculation processing;

a sub CPU including a second nonvolatile memory in which programs for input/output processing are written and a second RAM for calculation processing; and a serial-parallel converter for serial communication adapted to transmit a plurality of input signals, which are input to the sub CPU, to the main CPU, wherein a plurality of filter constants corresponding to the plurality of input signals are stored in at least one of the first and second nonvolatile memory; and the sub CPU has a digital filter section adapted to perform predetermined calculation based on the filter constants to transmit a result of the calculation to the main CPU.

Also, the serial-parallel converter for serial communication transmits a plurality of control output signals calculated by the main CPU to the sub CPU and the serial-parallel converter supplies the plurality of control output signals to an external load through an output interface circuit connected to a data bus of the sub CPU.

Also, the plurality of input signals input to the sub CPU are a plurality of analog signals input through a noise filter including at least positive and negative clip diodes and a capacitor with a small capacity. The plurality of analog signals are conducted digital conversion into a plurality of digital converted values through an A/D converter and a digital filter including a switched capacitor periodically charged and discharged by a change-over switch and a setting unit of a charge and discharge cycle. The digital filter section performs predetermined calculation using the digital converted values to transmit a result of the calculation to the main CPU.

Also, the plurality of input signals input to the sub CPU are a plurality of on-off signals input through a bleeder resistor with a low resistance acting as a load to an input switch, a noise filter including a series resistor with a high resistance and a capacitor with a small capacity, and a comparator for level determination having a hysteresis function. The digital filter section has an input confirmation section adapted to sample outputs from the comparator for level determination in a predetermined cycle to make an ON determination when positive results of the continuous plurality of sampling results are 50% or more and to make an OFF determination if the positive results of the continuous plurality of sampling results are less than 50%. Outputs of the input confirmation section are transmitted to the main CPU.

Also, the digital filter section comprises a setting section adapted to set at least one of a sampling cycle and the number of logical determination points of the comparator for level determination.

Also, a determination value to make the input confirmation section output an ON is variable in a range of proportion of the positive results in the plurality of sampling results from 50% to 100%.

Also, there are provided a retransmission determination section. The filter constants are constants, which are corresponding to types of controlled vehicles, written in the first nonvolatile memory of the main CPU. The filter constants are transferred to the second RAM of the sub CPU through the serial-parallel converter for serial communication. A sum check of setting constants including the filter constants used in the digital filter section of the sub CPU is performed in the sub CPU. When a check sum error occurs, the retransmission determination section again transfers the filter constants from the main CPU to the sub CPU.

Also, there are provided a transfer section adapted to transfer the filter constants to the first RAM;

a control constant correction section adapted to correct control constants including the filter constants stored in the first RAM; and a control constant transfer section adapted to transfer the corrected control constants to the second RAM of the sub CPU through the serial-parallel converter for serial communication. The filter constants are constants, which are corresponding to the types of controlled vehicles, written in the first nonvolatile memory of the main CPU. The control constants are used as setting constants of the digital filter section of the sub CPU.

Also, an input/output interface circuit for high-speed processing capable of inputting/outputting to the main CPU directly without intervention of the sub CPU is connected to a data bus of the main CPU. A signal input to the sub CPU through the input/output interface circuit is monitored by the sub CPU to transmit a monitor result to the main CPU.

Also, there are provided a removable connector adapted to connect an external tool;

a serial communication interface adapted to connect the external tool to the main CPU; and a writing mode determination section adapted to respond to operations of a part of the plurality of input signals supplied to the sub CPU and to generate a writing control signal from the sub CPU based on programs stored in the second nonvolatile memory. The writing control signal is supplied to a writing control terminal of the main CPU to transfer and write the control programs and the control constants from the external tool to the first nonvolatile memory.

BRIEF DESCRIPTION OF HE DRAWINGS

DETAILED DESCRIPTION OF THE INVENTION

[First Embodiment]

Figure 1:
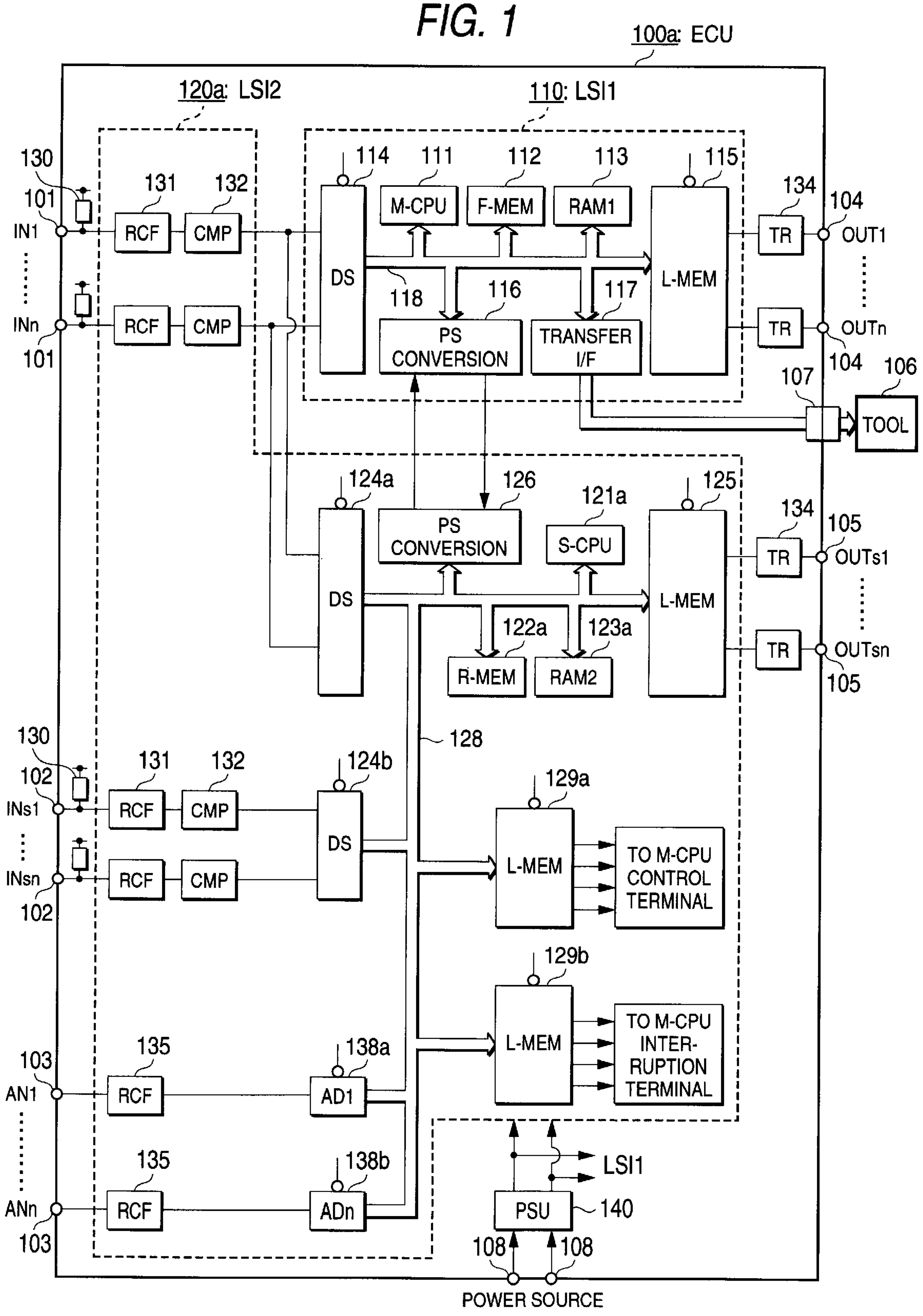
FIG. 1 is a block circuit diagram showing a vehicle-mounted electronic control apparatus according to a first embodiment of e invention.

FIG. 1 showing a block circuit diagram of a vehicle-mounted electronic control apparatus according to a first embodiment of the invention will be described below.

In FIG. 1, numeral 100*a* is an ECU (vehicle-mounted electronic control apparatus) made of one electronic board in which a first LSI (first integrated circuit) 110 and a second LSI (second integrated circuit) 120*a* are main parts.

Numeral 101 is a connector terminal, for example, in which relatively high frequent operations, such as a crank angle sensor for controlling ignition timing of an engine or fuel injection timing and a speed sensor for auto cruise control, are performed and high-speed input signals IN1 to INn of on-off actions necessary to speedily capture signals are inputted.

Numeral 102 is a connector terminal, for example, in which relatively low frequent operations, such as a selector switch for detecting a gear lever position and an air conditioner switch, are performed and low-speed input signals INs1 to INsn of on-off actions in which a delay in the signal capture does not create a problem too much are inputted.

Numeral 103 is a connector terminal, for example, in which relatively slow operations, such as an accelerator positioner, a water temperature sensor and an oxygen concentration sensor of exhaust gas, are performed and analog input signals AN1 to ANn in which a delay in the signal capture does not create a problem too much are inputted.

Numeral 104 is a connector terminal, for example, in which relatively high frequent operations, such as an ignition coil driving output of an engine and an electromagnetic valve driving output for fuel injection control, are performed and high-speed outputs OUT1 to OUTn of on-off actions necessary to produce a driving output without delay are outputted.

Numeral 105 is a connector terminal, for example, in which relatively low frequent operations, such as an electromagnetic valve driving output for transmission and an electromagnetic clutch driving output for air conditioner, are performed and low-speed outputs OUTs1 to OUTsn of on-off actions in which a delay in response of a driving output does not create a problem too much are outputted.

Numeral 106 is an external tool for previously transferring and writing control programs or control constants to the ECU 100*a*, and the external tool is used at the time of product shipping or maintenance work and is connected to the ECU 100*a* through a removable connector 107.

Numeral 108 is a power terminal connected to a vehicle-mounted battery and consists of a terminal supplied power through a power switch and a terminal for sleep directly supplied power from the vehicle-mounted battery in order to hold operations of memory described below.

The first LSI 110 comprises a main CPU (microprocessor) 111, a first nonvolatile memory 112, a first RAM memory 113, a data selector 114 for input, a latch memory 115 for output, a serial-parallel converter 116 for conducting serial signal communications with a sub CPU 121*a* described below, and an SCI (serial communication interface) 117 for conducting serial signal communications with the external tool 106, and these components are connected to the main CPU 111 through a data bus 118 of 8 to 32 bits.

Incidentally, a program loader (PLL) or a mask ROM, in which a boot program for starting of the PLL is stored (not shown), is built into the main CPU 111.

Also, the first nonvolatile memory 112 is, for example, flash memory capable of batch writing and is constructed so as to transfer and write transfer control programs, programs for vehicle control or constants for vehicle control from the external tool 106 through the first RAM memory 113.

The second LSI 120*a* comprises a sub CPU (microprocessor) 121*a*, a second nonvolatile memory 122*a*, a second RAM memory 123*a*, data selectors 124*a*, 124*b* for input, latch memory 125, 129*a*, 129*b* for output, a serial-parallel converter 126 for conducting serial signal communications with the main CPU 111, and A/D converters 138*a*, 138*b* for making analog-to-digital conversions, and these components are connected to the sub CPU 121*a* through a data bus 128 of 8 bits.

Incidentally, the second nonvolatile memory 122*a* is, for example, mask ROM (read only memory), and input/output control programs handled by the sub CPU 121*a* or programs for communication with the main CPU 111 are stored.

However, for example, it is constructed so that a digital filter constant described below is stored from the first nonvolatile memory 112 to the second RAM memory 123*a* through the first RAM memory 113 and the serial-parallel converters 116, 126.

Numeral 130 are bleeder resistors with low resistance of several KΩ, and the bleeder resistors are connected to a positive side (pull-up) or a negative side (pull-down) of the power source and connected to each the on-off input terminal IN1 to INn and Ins1 to Insn, respectively, so as to form a load to an input signal switch. When an input switch is OFF, the input terminal becomes an open state and thus the bleeder resistor avoids a superimposing of noise, or when the input switch is a contact, the bleeder resistor has a function of improving reliability of the contact.

Numeral 131 is a noise filter described below in FIG. 4, and Numeral 132 is a comparator for level determination described below in FIG. 4 and each the on-off input signal is connected from the noise filter 131 to the data selectors 114, 124*a*, 124*b* for input through the comparator 132 for level determination.

Incidentally, the high-speed inputs IN1 to INn are connected to both of the data selector 114 of the main CPU 111 side and the data selector 124*a* of the sub CPU 121*a* side.

Numeral 134 is a transistor for load driving and is connected between the latch memory 115 and the high-speed output terminals 104 or between the latch memory 125 and the low-speed output terminals 105, and it is constructed so as to drive external loads OUT1 to OUTn or OUTs1 to OUTsn by output signals of the latch memory 115 or 125.

Numeral 135 is a noise filter described below in FIG. 5, and Numerals 138*a*, 138*b* are A/D converters connected to the analog signals AN1 to ANn through the noise filter 135.

Incidentally, an output of the latch memory 129*a* is directly connected to a mode control terminal of the main CPU as a writing control output described below in a fourth embodiment, and an output of the latch memory 129*b* is directly connected to an interruption control terminal of the main CPU as an input monitor control output described below in a third embodiment.

Also, numeral 140 is a power unit for supplying power to the first LSI 110 and the second LSI 120*a* by supplying from the power terminal 108, and the power unit, the bleeder resistor 130 and the output transistor 134 are provided in the outside of the second LSI 120*a*.

Incidentally, as a high-speed analog input signal (not shown), a piezo-electric sensor for detecting knocking of an engine is directly connected to the main CPU 111, and also an operation check signal and a load current detecting signal of the output transistor 134 are captured as an input signal of the data selectors 114, 124*a*, 124*b* as a signal occurring inside the ECU 100*a* and is connected to the data buses 118, 128 through an A/D converter (not shown).

Also, as necessary, a D/A converter for meter display can be mounted, but since the number of low-speed outputs of on-off actions is not too large, all the outputs may be produced from the latch memory 115 of the main CPU 111 side in relation to outputs.

Further, the main CPU 111 performs runaway monitor control of the sub CPU 121*a*, and a watch dog timer circuit for operating in response to a watch dog signal of the main CPU 111 or a reset control circuit of the main CPU 111 is added in the second LSI 120*a*.

Figure 2A:
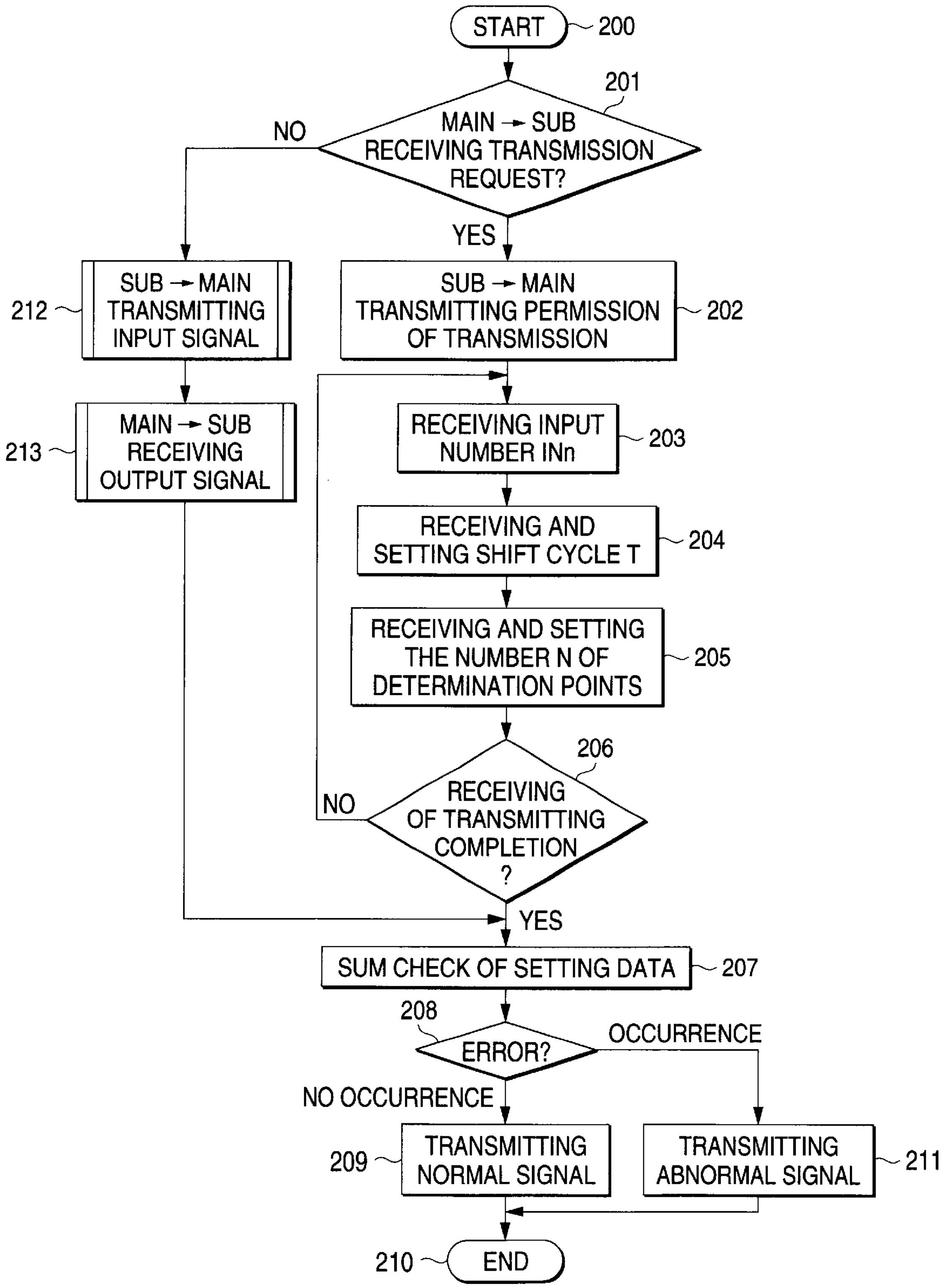
FIGS. 2A to 2C are flowcharts showing operations of the vehicle-mounted electronic control apparatus according to the first embodiment of the invention.
Figure 2B:
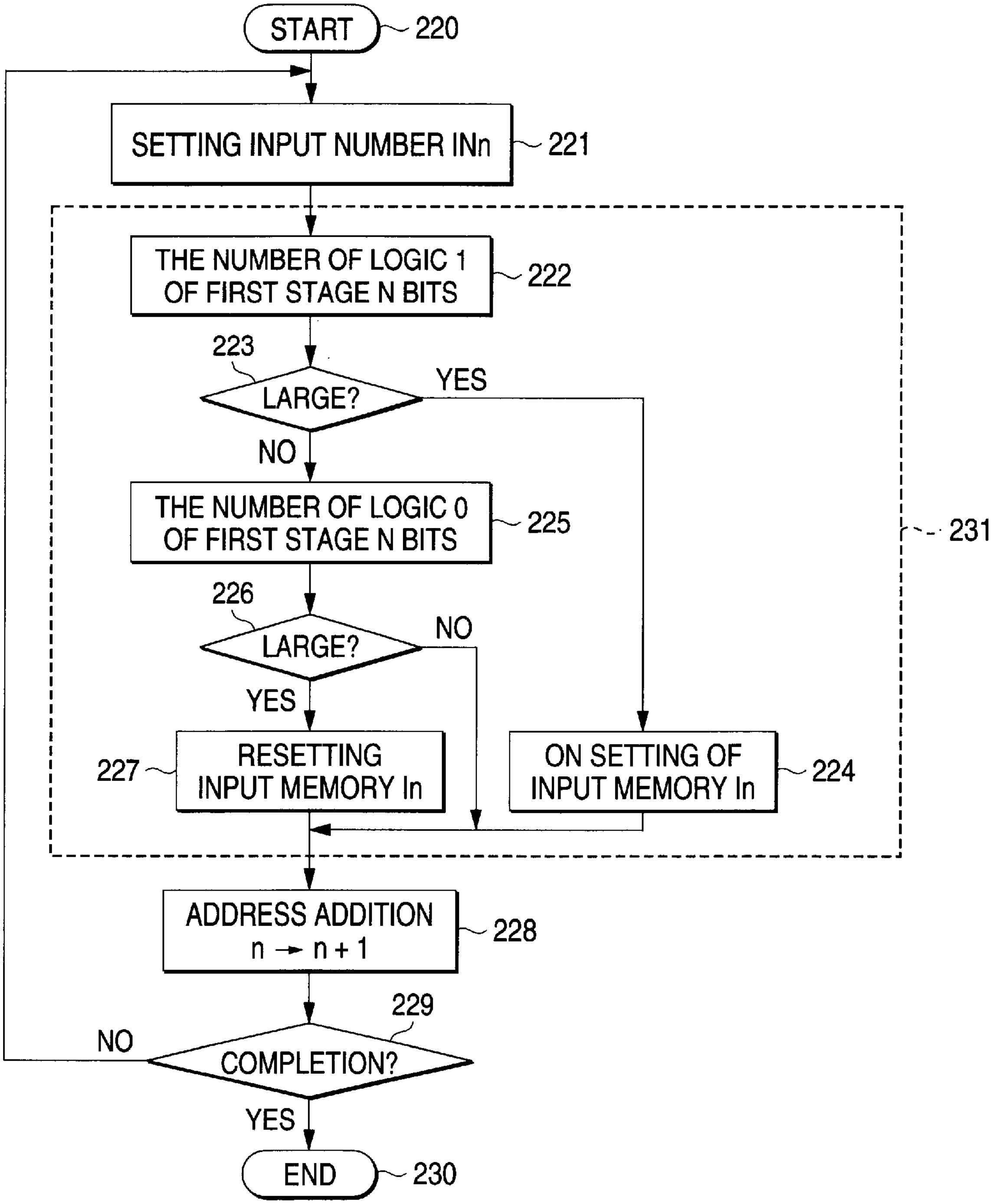
Figure 2C:
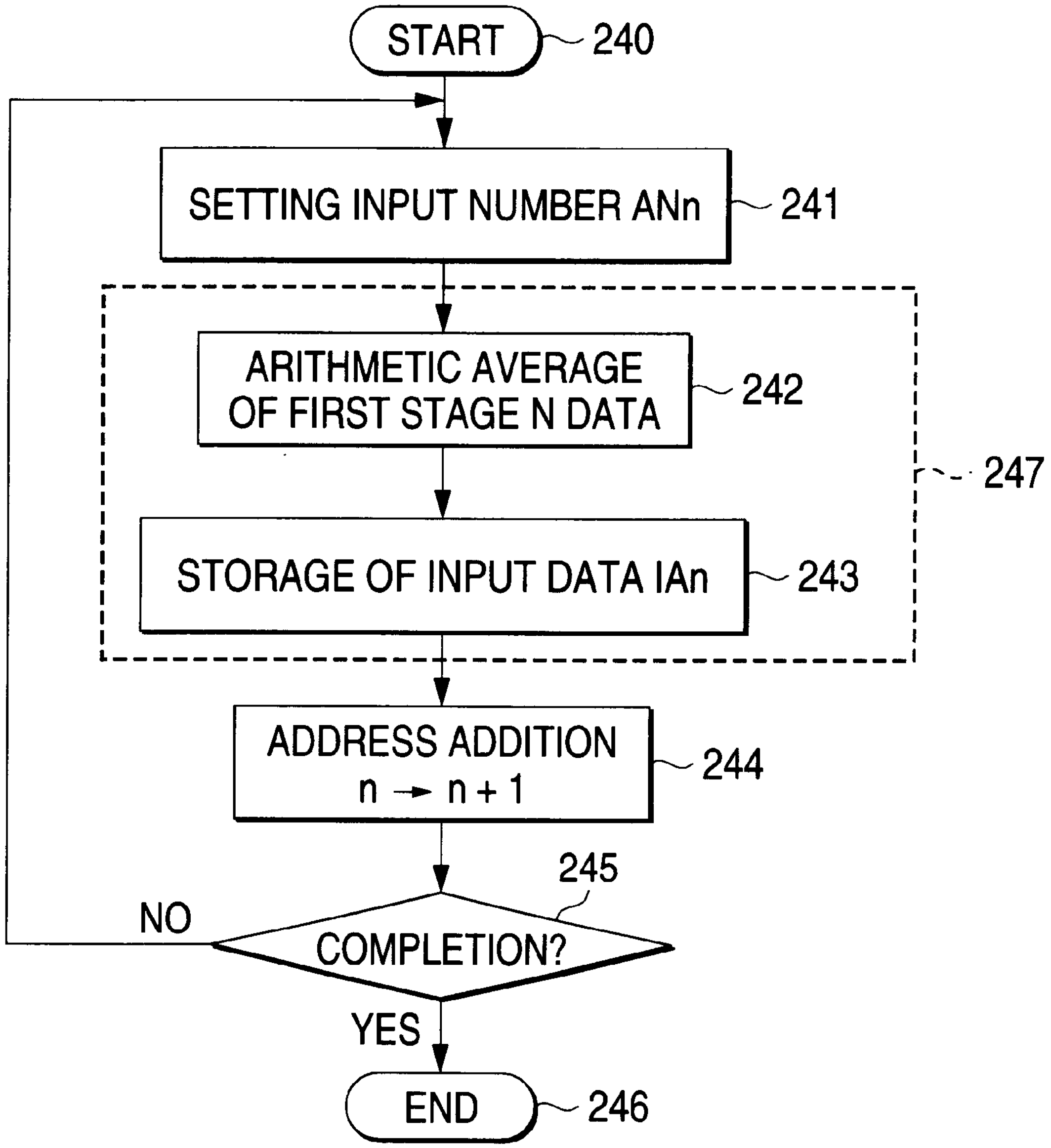

In the vehicle-mounted electronic control apparatus according to the first embodiment of the invention constructed as shown in FIG. 1, flowcharts of FIGS. 2A to 2C showing functions and operations will be described.

FIG. 2A centers on an operational flow of the sub CPU 121*a* side for transferring and setting a filter constant from the main CPU 111 to the sub CPU 121*a*. Numeral 200 is an operating start step, and numeral 201 is a step of determining whether the sub CPU 121*a* has received a sending request from the main CPU 111 or not, and numeral 202 is a step in which the sub CPU 121*a* sends a send permission signal to the main CPU 111 on receiving the sending request, and numerals 203, 204, 205 are steps of receiving a shift cycle T and the number N of determination points corresponding to an input number INn sent from the main CPU 111 to store the shift cycle T and the number N in the second RAM memory 123*a* and it is constructed so that the shift cycle T and the number N of determination points are considered as deciding filter constants of the digital filter and constants related to all the associated input numbers are repeatedly sent.

However, after all the constants have been already sent, only a part of constants for modification or only scale factor information for batch modification may be sent.

Numeral 206 is a determination step for proceeding to the next step 207 when the sub CPU 121*a* receives fact that sending of a series of constants has been completed. Numeral 207 is a step of making a sum check of all the received constants, and numeral 208 is a step of determining whether a sum check error occurs or not, and numeral 209 is a step in which the sub CPU 121*a* sends a normal signal if the error does not occur, and numeral 211 is a step in which the sub CPU 121*a* sends an abnormal signal if the error occurs in step 208, and numeral 210 is an end step and an operation again proceeds to the start step 200 when a series of the step operations are ended.

When the constant sending request from the main CPU 111 does not occur, in step 212, the on-off input signals IN1 to INsn or digital values of the analog signals AN1 to ANn are sent to the main CPU 111, or in step 213, output signals corresponding to the control outputs OUTs1 to OUTsn are sent from the main CPU 111 to the sub CPU 121*a*, and when a series of sending and receiving are completed, in step 207, the sum check of setting data such as the shift cycle T and the number N of determination points is again made.

FIG. 2B shows an operational flow of digital filter control to on-off input signals executed in the sub CPU 121*a*. Numeral 220 is an operating start step. Numeral 221 is a step of setting an input number INn of an object. Numeral 222 is a step of calculating the number of logic "1" of N sampling values including the latest state in relation to anon-off state (logic "1" or "0") of the input number INn sequentially sampled in the shift cycle T already set. Numeral 223 is a determination step of proceeding to the next step 224 if the number of logic "1" calculated in step 222 is large (for example, all the N values are logic "1" or the values 90% or more are logic "1"). Numeral 224 is a step of setting an input image memory number In within the second PAM memory 123*a* at ON and the contents of the input image memory In indicate the on-off state confirmed at the present time.

Numeral 225 acts if the determination step 223 is no (the number of logics "1" is not large) and Numeral 225 is a step of calculating the number of logics "0" of N sampling values including the latest state in relation to the on-off state (logic "1" or "0") of the input number Inn. Numeral 226 is a determination step of proceeding to the next step 227 if the number of logics "0" calculated in step 225 is large (for example, all the N values are logic "0" or the values 90% or more are logic "0"). Numeral 227 is a step of resetting an input image memory number In within the second PAM memory 123*a* at OFF and the contents of the input image memory In indicate the on-off state confirmed at the present time.

Numeral 228 is a step of updating an input number INn of the object to the next number if the contents of the input image memory In are updated by step 224 or step 227, or both of step 223 and step 226 are no (the number of logics "1" is not large and the number of logics "0" is not large and thus there is a halfway state and the contents of the input image memory In do not change). Numeral 229 is a completion determination step for returning to step 221 until processing of all the input numbers is completed and proceeding to an end step 230 when the processing of all the input numbers is completed, and an operation again proceeds to the start step 220 after proceeding to the end step 230.

Incidentally, digital filter section 231 is formed by a series of steps from step 222 to step 227.

In order to surely detect a normal on-off of an input signal, the shift cycle T corresponding to the sampling time must be set to the short time in firsts to some tenths of the shorter time of the normal ON time or OFF time of the input signal. The product of the shift cycle T and the number N of determination points must be set to time shorter than the shorter time of the normal ON time or OFF time of the input signal. However, in actuality, plural kinds of the shift cycles grouped properly are used as the shift cycle T set to the each input and the number N of determination points is set based on each input.

Also, step 223 or 226 which is the confirmation step of input may generally determine whether all the logics are "1" or "0". In this case, step 223 can easily make the determination by the logical product of the numbers N and step 226 can easily make the determination by the logical sum of the numbers N.

According to the digital filter section 231 described above, for example, when an input contact chatters and converges on an ON while repeating on-off operations in a wiggle manner, the wiggly on-off operations are not too sampled and even if the on-off operations are sampled, an input ON is confirmed only when multiple sampling values are ON continuously.

Also, for example, in a manual operation switch such as an air conditioning switch, when the switch is momentarily turned on, this state is ignored and as a result of that, a malfunction due to noise is also prevented.

Further, in order to prevent false input signals (for example, input signals in which signals to be naturally considered as ON are mistaken for OFF due to noise) from continuing every sampling accidentally due to superimposing of high-frequency noise, the noise filter 131 and the comparator 132 for level determination is provided as an input interface circuit and function thereof is described later using FIG. 4.

FIG. 2C shows an operational flow of digital filter control to analog input signals executed in the sub CPU 121*a*. Numeral 240 is an operating start step. Numeral 241 is a step of setting an input number ANn of the object. Numeral 242 is a step of calculating an arithmetic average of the latest N digital values sequentially sampled in the shift cycle T already set. Numeral 243 is a step of confirming the arithmetic average value calculated in the step 242 as the digital value at the present time and storing the value in input data memory IAn within the second PAM memory 123*a*. Numeral 244 is a step of deciding the next input number. Numeral 245 is a step of determining whether processing to all the inputs is completed or not and if not, and if the processing is not completed, an operation returns to step 241, and if the processing is completed, an operation proceeds to an end step 246 and from here, again proceeds to the start step 240.

A digital filter 247 is formed of the steps 242 and 243, and the contents of the input data memory IAn are moving average values updated every sampling.

Incidentally, in order to be constructed so that each sampling value does not include an abnormal value due to noise, the noise filter 135 is connected as an input interface circuit and function thereof is described later in FIG. 5.

According to the digital filter sections 231 and 247 described above, an effect equivalent to a configuration in which a capacity of a capacitor is increased by a noise filter using resistor/capacitor is produced, but the increase in the capacity of the capacitor is unsuitable for integration of circuits and it also becomes difficult to change the capacity of the capacitor in correspondence with types of controlled vehicles, so that the digital filter is formed by software of the sub CPU according to this embodiment.

Incidentally, in the first embodiment, a configuration for providing the sub CPU side outputs (the connector terminal 105, the latch memory 125, the transistor 134 for load driving) has been described, but this configuration is not necessarily provided. However, in the case of providing these sub CPU side outputs, when the main CPU is monitored and determined to detect runaway, measures can be taken to the sub CPU side outputs so as to ensure safety (for example, breaking of motor power).

[Second Embodiment]

Figure 3:
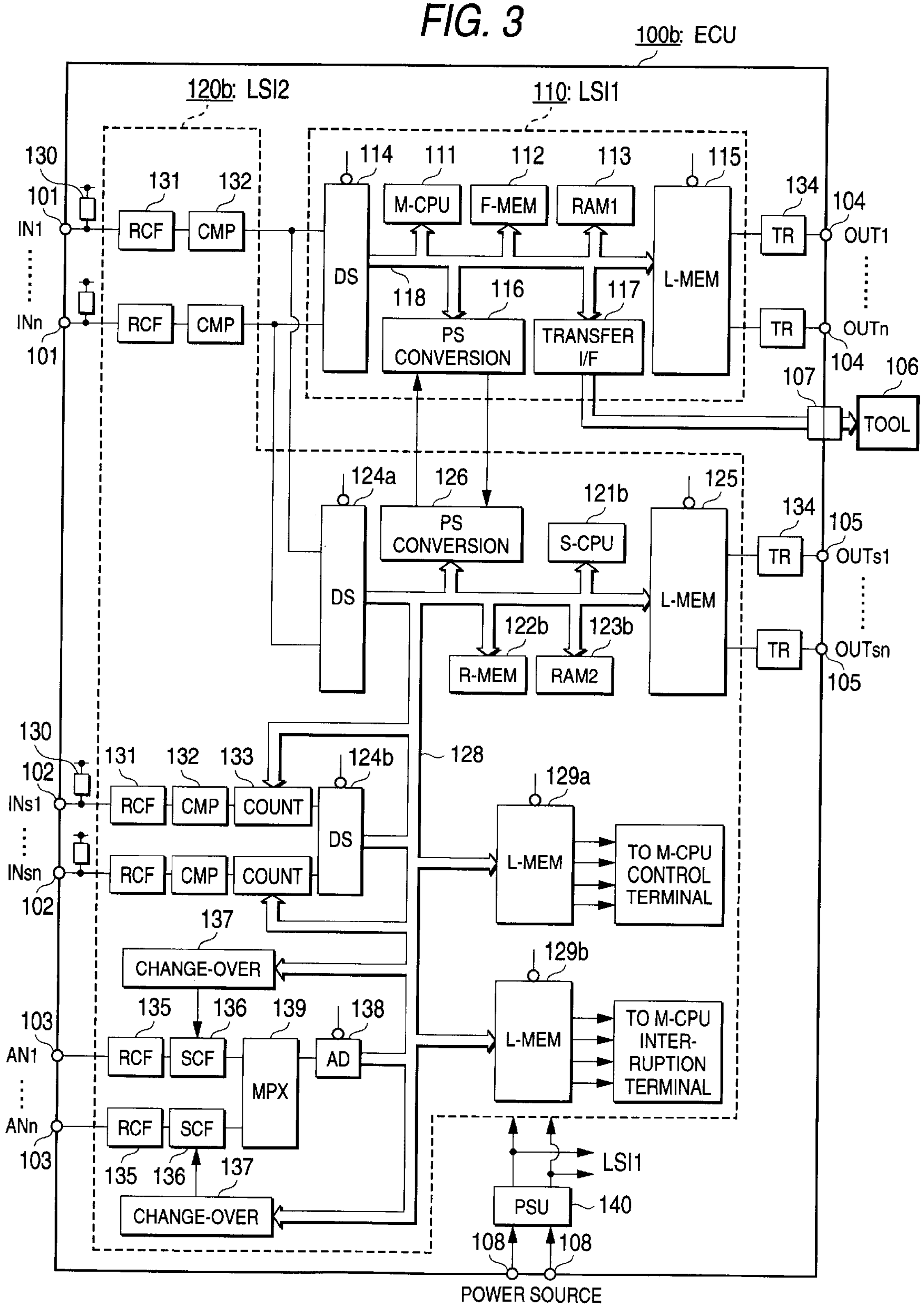
FIG. 3 is a block circuit diagram showing a vehicle-mounted electronic control apparatus according to a second embodiment of the invention.

In relation to FIG. 3 showing a block circuit diagram of a vehicle-mounted electronic control apparatus according to a second embodiment of the invention, differences between FIG. 1 and FIG. 3 will be mainly described below.

In FIG. 3, numeral 100*b* is an ECU (vehicle-mounted electronic control apparatus) made of one electronic board in which a first LSI (first integrated circuit) 110 and a second LSI (second integrated circuit) 120*b* are main parts.

The second LSI 120*b* comprises a sub CPU (microprocessor) 121*b*, a second nonvolatile memory 122*b*, a second RAM memory 123*b*, data selectors 124*a*, 124*b* for input, latch memory 125, 129*a*, 129*b* for output, a serial-parallel converter 126 for conducting serial signal communications with the main CPU 111, and an A/D converter 138*a* for making analog-to-digital conversions, and these components are connected to the sub CPU 121*b* through a data bus 128 of 8 bits.

Numeral 133 is a counter acting as a digital filter for on-off input signal connected between a comparator 132 for level determination and the data selector 124*b*, and the configuration and function thereof will be described in detail by way of FIG. 4.

Numeral 136 is a switched capacitor acting as digital filter section for analog input connected between a noise filter 135 and a multiplexer 139. Numeral 137 is a change-over switch for the switched capacitor. Numeral 138 is an A/D converter for converting analog signals sequentially switched and connected by the multiplexer 139 into digital values, and a configuration and function of the switched capacitor 136 will be described in detail by way of FIG. 5.

Figure 4:
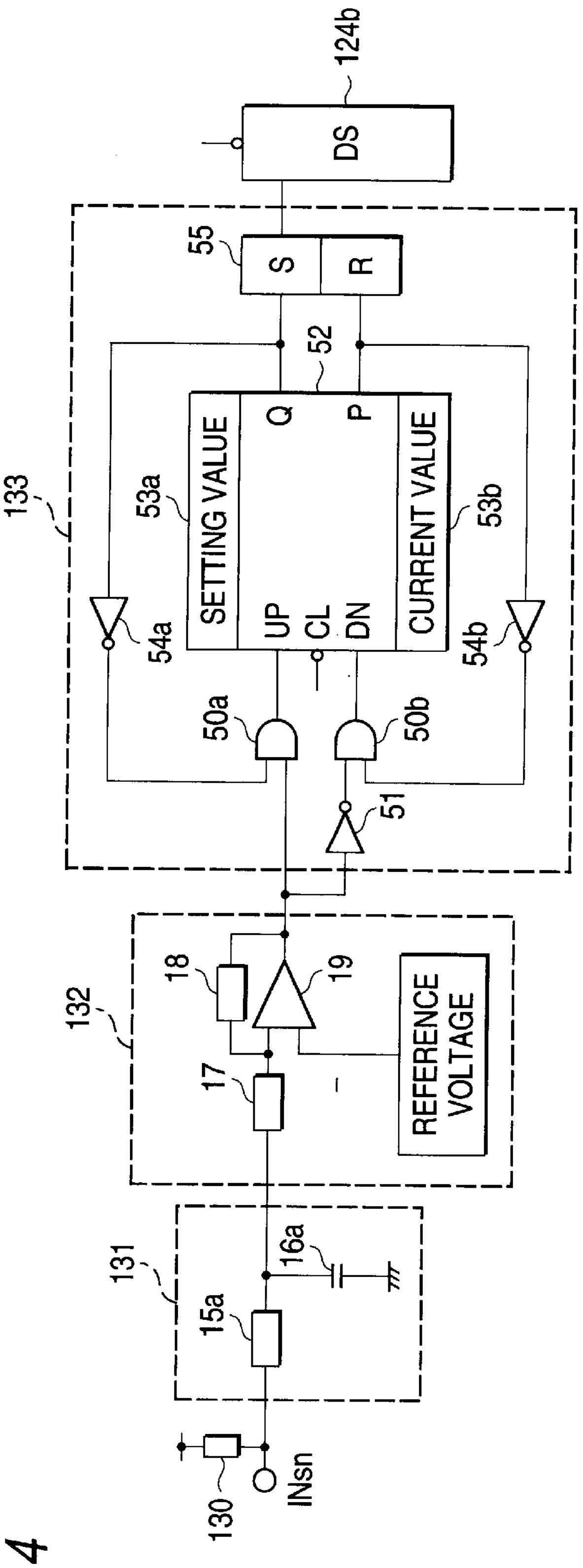
FIG. 4 is a block circuit diagram showing the vehicle-mounted electronic control apparatus according to the second embodiment of the invention.

FIG. 4 shows the counter 133 and its peripheral circuits, and the input signal INsn providing the bleeder resistor 130 with a low resistance described above is connected to a parallel capacitor 16*a* with a small capacity of some ten pF through a series resistor 15*a* with a high resistance of several hundreds KΩ which is the practicable upper limit value.

Numeral 131 is a noise filter formed of the series resistor 15*a* and the parallel capacitor 16*a* to be intended for absorbing and smoothing high-frequency noise.

Numeral 132 is a comparator 132 for level determination formed of an input resistor 17, a positive feedback resistor 18 and a comparator 19. A predetermined reference voltage Von is applied to a negative side input of the comparator 19.

Therefore, when a charging voltage of the capacitor 16*a* becomes the reference voltage Von or higher, an output of the comparator 19 becomes "H" (logic "1") However, if once the output of the comparator 19 becomes "H", input addition by the positive feedback resistor 18 occurs. Therefore, a hysteresis function is provided so that the output of the comparator 19 becomes "L" (logic "0") only when the charging voltage of the capacitor 16*a* decreases to Voff (<Von).

This is intended for preventing the output of the comparator 19 from reversing and changing with high frequency due to noise ripples superimposed on the capacitor 16*a*.

Numeral 50*a* is a gate element connected between the output of the comparator 19 and a count up mode input UP of a reversible counter 52. Numeral 51 is a logical inversion element connected from the output of the comparator 19 to a count down mode input DN of the reversible counter 52 through a gate element 50*b*. The reversible counter 52 provides a clock input terminal CL for performing on-off operations in a predetermined sampling cycle (corresponding to the shift cycle T of FIG. 2A) and is constructed so as to reversibly count clock-inputs according to the mode input UP or DN.

Numeral 53*a* is a setting value register in which a setting value corresponding to the number N of determination points of FIG. 2A is stored. Numeral 53*b* is a current value register in which a current value of the reversible counter 52 is stored. Numeral 54*a* is a logical inversion element constructed so that further count up is not performed by closing the gate element 50*a* by an output Q achieving logic "1" when the current value of the reversible counter 52 reaches the setting value. Numeral 54*b* is a logical inversion element constructed so that further count down is not performed by closing the gate element 50*b* by an output P achieving logic "1" when the current value of the reversible counter 52 reaches zero. Numeral 55 is a flip-flop element which is set by the output Q when the current value of the reversible counter 52 reaches the setting value and is reset by the output P when the current value reaches zero. An output of the flip-flop element is connected to an input terminal of the data selector 124*b*.

In the reversible counter 52 thus constructed, the flip-flop element 55 is set when the output of the comparator 19 is "H" continuously until the number of input pulses of the clock input CL operating in the sampling cycle T reaches the setting value N of the setting value register 53*a*. But when the output of the comparator 19 becomes "L" on the way, the clock inputs are subtracted and counted and after the output of the comparator 19 again becomes "H", addition count is performed and when the current value reaches the setting value soon, the flip-flop element 55 is set.

Similarly, once the flip-flop element 55 is set, the flip-flop element 55 is reset when the output of the comparator 19 is "L" continuously during the current value decreases from N to zero by input pulses of the clock input CL operating in the sampling cycle T. But when the output of the comparator 19 becomes "H" on the way, the clock inputs are added and counted and after the output of the comparator 19 again becomes "L", subtraction count is performed and when the current value reaches zero soon, the flip-flop element 55 is reset.

Figure 5:
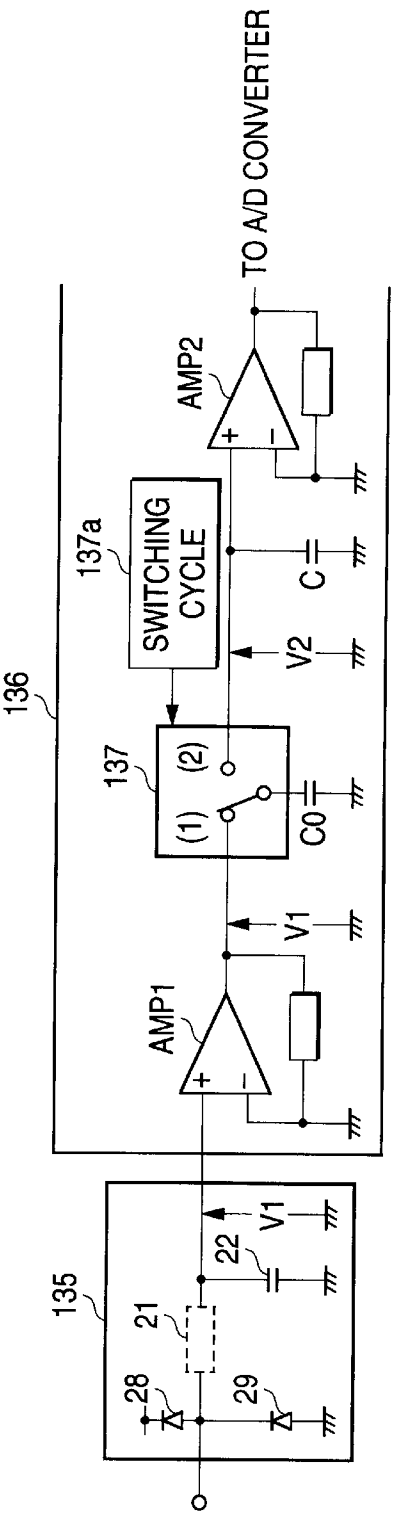
FIG. 5 is a block circuit diagram showing the vehicle-mounted electronic control apparatus according to the second embodiment of the invention.

FIG. 5 shows an equivalent circuit of the switched capacitor 136 in FIG. 3 for description and its peripheral circuits.

In FIG. 5, numeral 135 is a noise filter to an analog input signal Ann. The noise filter comprises a positive side clip diode 28, a negative side clip diode 29, a series resistor 21 and a parallel capacitor 22.

The clip diodes 28 and 29 are intended not to apply voltage beyond the maximum and minimum values of an assumed analog signal to the capacitor 22 by cycling the noise voltage to positive and negative circuits of a power source when excessive noise is superimposed on the analog input signal ANn.

Also, the series resistor 21 maybe omitted when an analog sensor has an appropriate internal resistance.

A capacitor C0 constructing the switched capacitor 136 is switched to the signal side (1) or the output side (2) periodically by the change-over switch 137 and the switching cycle T is a value set by cycle setting unit 137*a*.

A voltage V1 across the capacitor 22 is applied to the signal side (1) through an amplifier AMP1. An output capacitor C is connected to the output side (2). A voltage V2 across the capacitor C is supplied to the A/D converter 138 through an amplifier AMP2 and the multiplexer 139.

In the switched capacitor 136 constructed thus, the following relation expression holds when a charge and discharge resistance to the capacitor C0 is enough small.

Stored charge of capacitor $C0$ in the side (1) $Q1=C0\times V1$

Stored charge of capacitor $C0$ in the side (2) $Q2=C0\times V2$

Moving electric charge for $T$ seconds $Q=Q1-Q2=C0(V1-V2)$

Average current for T seconds $I=Q/T=C0(V1-V2)/T$

Equivalent resistance $R0=(V1-V2)/I=T/C0$

Accordingly, the switched capacitor 136 described above is equivalent to a filter by the series resistance R0 and the output capacitor C, and the resistance RO becomes a large value in proportion to the switching cycle T. However, the switching cycle T corresponds to the shift cycle T set in step 204 of FIG. 2A and in this case, setting of the number N of determination points set in step 205 is eliminated.

As is evident from the description, in the embodiment of FIG. 1, the digital filter wholly depending on software by the sub CPU 121*a* is constructed. On the contrary, in the embodiment of FIG. 3, a target filter constant is set by the sub CPU 121*b* and by hardware corresponding to this, the digital filter is constructed.

In the software-dependent digital filter, response becomes worse while there is a merit of reducing peripheral circuit parts.

The hardware-dependent digital filter is vice versa and in actuality, one ideal form is that on-off input signals are constructed by the software-dependent type and analog input signals are constructed by the hardware-dependent type (the A/D converter is reduced by the combined use of the multiplexer).

However, a moving average method shown in FIG. 2 may be used in the analog input signals and the multiplexer may be eliminated to provide A/D converters each input, and various embodiments may be combined.

[Third Embodiment]

In the embodiment of FIG. 1 or FIG. 3, the high-speed inputs IN1 to INn are captured to the main CPU 111 side through the data selector 114 while being also captured to the sub CPU 121*a* or 121*b* side through the data selector 124*a*. Here, as a description of the high-speed inputs, for example, referring to examples of items controlled based on information about a crank angle sensor and a resolution, a resolution for ignition control is 4 $\mu$s and a resolution for rotary variation detection of an engine is 1 $\mu$s, and thus a resolution of a detecting timer of SGT is 0.25 $\mu$s. Therefore, it is desirable that an input/output interface circuit for high-speed processing directly inputted and outputted to the main CPU provide performance satisfying these resolutions. One example of effective use methods by such a configuration is as follows.

For example, the engine crank angle sensor, which is one of the high-speed inputs, needs to be captured to the main CPU 111 without delay as an input for determining ignition timing of the engine or fuel injection timing. It is difficult to receive the engine crank angle sensor from the sub CPU 121*a* or 121*b* as a serial signal.

However, it is possible to integrate pulses of the crank angle sensor every predetermined time to calculate an average rotational speed of the engine even in the sub CPU 121*a* or 121*b* side. It can be determined even in the side of the sub CPU, whether there is an abnormal rotational speed of the engine or not and redundancy of safety can be improved.

Also, determining whether or not there is a state in which various input signals are not inputted properly due to a broken wire or a short circuit of sensor circuits in the sub CPU 121*a* or 121*b* side, a load of the main CPU 111 can be reduced.

In this manner, input monitor control is performed in the sub CPU 121*a* or 121*b* side. If there is an abnormal state, an abnormal output can be supplied to an interruption terminal of the main CPU 111 through the latch memory 129*b* of FIG. 1 or FIG. 3.

Incidentally, also in relation to low-speed inputs supplied to the main CPU 111 via the sub CPU 121*a* or 121*b*, the proper operation is monitored in the sub CPU 121*a* or 121*b* side. If there is an abnormal state, an abnormal output is supplied to the main CPU 111 through the latch memory 129*b*. Similarly, in relation to analog signals of low-speed operations, for example, it can be determined whether an abnormal rapid increase in water temperature occurs or not in the sub CPU 121*a* or 121*b* side. Various monitor abnormal results can be numbered by a code and the contents can be reported to the main CPU 111 through the series-parallel converters 126 and 116.

[Fourth Embodiment]

In FIG. 1 or FIG. 3, it has been described that a writing control output is supplied to a control terminal of the main CPU 111 through the latch memory 129*a* of the sub CPU 121*a* or 121*b* side. One example of generation methods of this control output is as follows.

For example, an encryption input operation is performed by shifting a selector switch to neutral and operating an accelerator pedal and a brake pedal as if there were dots and dashes of Morse code.

The sub CPU 121*a* or 121*b* supplies the writing control output to the latch memory 129*a* when the input operation matching with an encryption operation procedure stored in the second nonvolatile memory 122*a* or 122*b* is performed.

Figure 6:
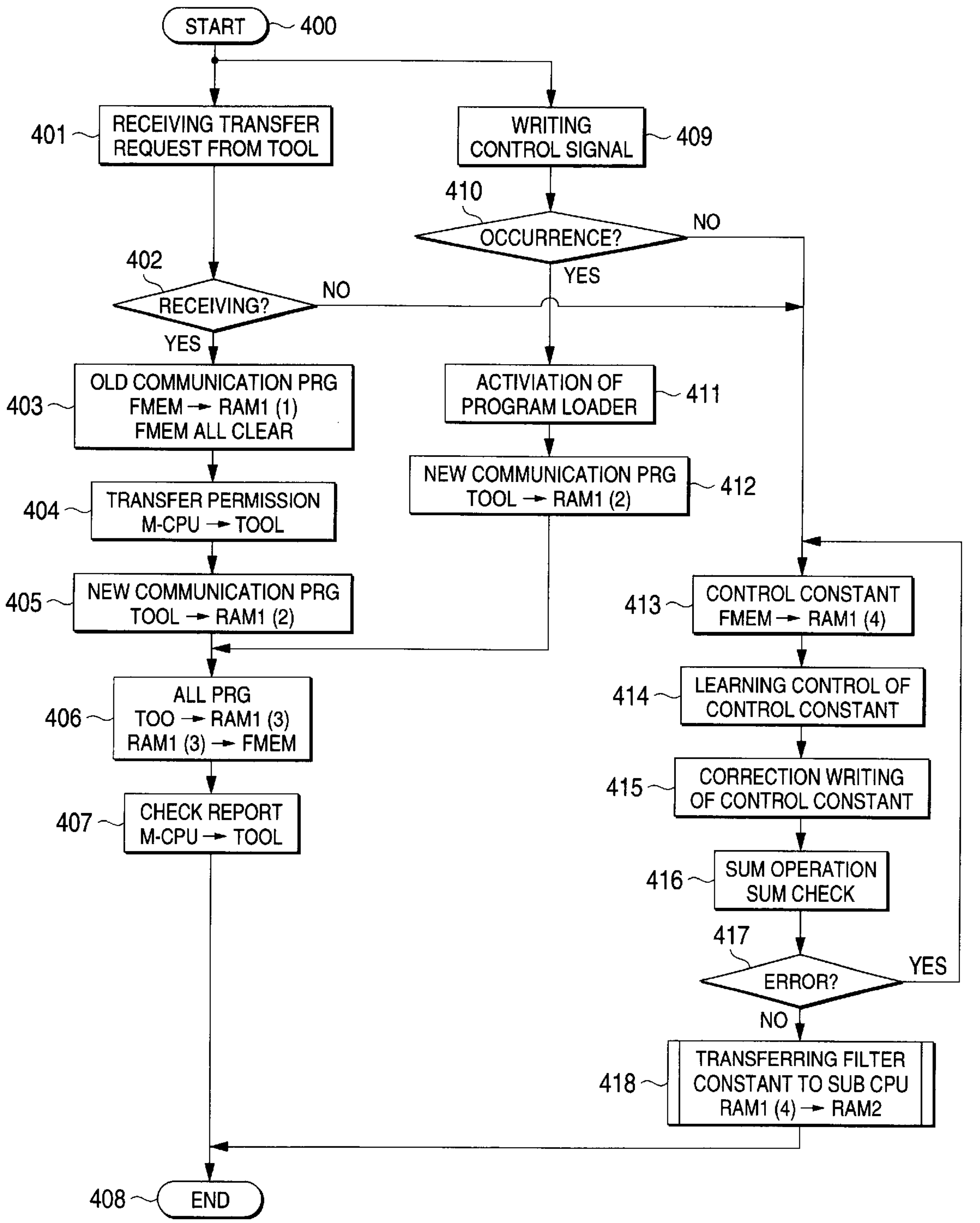
FIG. 6 is a flowchart showing operations of a vehicle-mounted electronic control apparatus according to a fourth embodiment of the invention.
Figure 7:
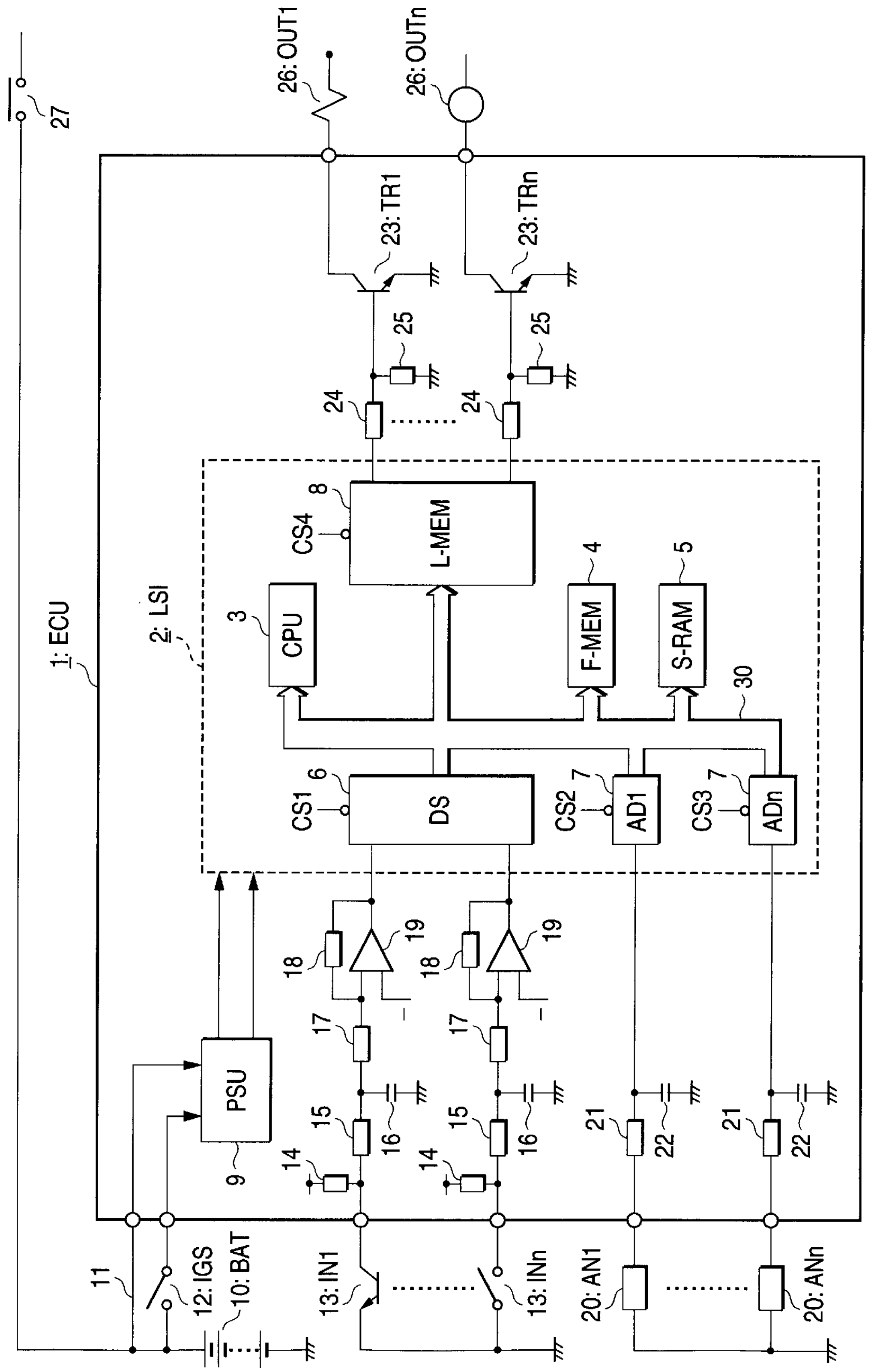
FIG. 7 is a block circuit diagram showing a conventional vehicle-mounted electronic control apparatus.

FIG. 6 shows an operational flow for description associated with writing programs of the main CPU 111 side.

Incidentally, details and locations of the generalized programs are as follows.

first nonvolatile memory 112 (in case of already written)

- A1: communication program for data transfer processing between a tool and the main CPU 111
- B1: control program to controlled vehicle
- C1: control constants referred to during execution of the control program (Also, an input filter constant is a part of the control constants.)

external tool 106

The contents are ditto, but are as follows assuming that the contents of the first nonvolatile memory 112 wish to be changed.

- A2: communication program concerned to rewrite
- B2: control program concerned to rewrite
- C2: control constants concerned to rewrite mask ROM within main CPU 111

- D: boot program for program loader starting

This is a communication program in which a function of transferring only the communication program A2 from the external tool 106 to a predetermined area (2) of the first RAM memory 113 is limited.

In FIG. 6, numeral 400 is an operating start step. When writing programs from the external tool 106 to the main CPU 111 is performed, after an engine is stopped and the external tool 106 is connected to the removable connector 107, a power switch is turned on and an operation key provided on a panel surface of the external tool 106 is operated to make a transfer request.

A communication program in this case depends on the communication program A1 stored in the first nonvolatile memory 112.

Step 401 is a step of interrupt-monitoring periodically the transfer request from the external tool 106 to the main CPU 111. When the transfer request is received here, step 403 operates through determination step 402.

In step 403, the communication program A1 is stored in a predetermined area (1) within the first RAM memory 113 from the first nonvolatile memory 112 and subsequently, all the contents of the first nonvolatile memory 112 are erased.

In subsequent step 404, a transfer permission signal from the main CPU 111 to the external tool 106 is sent. A communication program in this case is the communication program Al stored in a predetermined area (1) of the first RAM memory 113.

In step 405 subsequent to this, a new communication program A2 is written from the external tool 106 to a predetermined area (2) of the first RAM memory 113 through the main CPU 111 and subsequent communications with the external tool are conducted by this new communication program A2. (however, new and old communication programs are the same contents when a change of the communication program is not the purpose.)

In step 406 subsequent to this, all the programs A2, B2, C2 are written from the external tool 106 to a predetermined area (3) of the first RAM memory 113 through the main CPU 111 and then are written into the first nonvolatile memory 112 in a batch manner.

In step 407 subsequent to this, sum check operations of all the received programs are performed and the result is reported to the external tool 106.

An operation proceeds to the start step 400 again from an end step 408 subsequent to this. However, a series of operations described above are operations in case that the first nonvolatile memory 112 has the communication program A1. When a battery power terminal is opened accidentally or an abnormal decrease in a power voltage occurs after the communication program A1 is stored in the first RAM memory 113 and all the contents of the first nonvolatile memory 112 are erased in the operations of the first time or step 403, the communication program A1 will disappear.

Step 409 is a step of functioning in case that the main CPU 111 does not have the communication program A1. When a writing control output based on encryption operations is supplied from the latch memory 129*a* (see FIG. 1 and FIG. 3) to the mode control terminal of the main CPU 111, an operation proceeds to step 411 through determination step 410.

In step 411, a program loader within the main CPU 111 is activated by the boot program D. The communication program A2 is transferred from the external tool 106 through the main CPU 111 by subsequent step 412 and is written in the predetermined area (2) of the first RAM memory 113.

Operations after step 406 subsequent to this have been described already.

The description related to the program transfer between the main CPU 111 and the external tool 106 has been given above. Operations of transferring a filter constant acting as control constants from the main CPU 111 side to the second RAM memory 123*a* or 123*b* of the sub CPU 121*a* or 121*b* side are described as follows.

If it is determined that the program transfer request from the external tool 106 or the writing request from the mode control terminal does not occur in the determination step 402 or 410, an operation proceeds to step 413.

In step 413, a part (filter constant) of the control constants C1 is transferred from the first nonvolatile memory 112 to a predetermined area (4) within the first RAM memory 113.

In step 414 subsequent to this, calculation a proper value of a part of the control constants and learning control according to a running state of a vehicle are performed. By that result, the contents of the predetermined area (4) within the first RAM memory 113 are corrected in step 415.

In step 417 subsequent to this, a sum check of filter constant data to be transferred to the sub CPU 121*a* or 121*b* is made and if an error occurs, steps 413 to 416 are again performed.

If the error does not occur in step 417, operation proceeds to step 418. The filter constant stored in the predetermined area (4) of the first RAM memory 113 is transferred to the second RAM memory 123*a* or 123*b* of the sub CPU 121*a* or 121*b* side through the serial-parallel converters 116 and 126.

Once the filter constants to multiple input signals are transferred to the sub CPU 121*a* or 121*b* side, since the filter constants are backed up by a battery, the filter constants generally are not again changed in a batch manner and are changed in relation to a slight part of the inputs during runs or only a scale factor for a batch change according to a rotational speed area of an engine is sent.

[Fifth Embodiment]

In each of the embodiments, the description in which the control programs of the sub CPU 121*a* or 121*b* are stored in the second nonvolatile memory 122*a* or 122*b* which is the mask ROM (read only memory) and the filter constants are transferred from the nonvolatile memory 112 of the main CPU 111 to the second RAM memory 123*a* or 123*b* of the sub CPU side has been given.

In such a method, there is merit capable of properly correcting and using the filter constants from the main CPU side during runs. When assuming the case that an abnormal decrease in a battery voltage or an opening of a power terminal occurs, it is necessary to always check the contents of the RAM memory. If a sum check error occurs, source information can again be fetched from the first nonvolatile memory 112.

In addition, as control data other than the filter constants, the following information can be transferred from the non-volatile memory 112 of the main CPU 111 to the second RAM memory 123*a* or 123*b* of the sub CPU side. The sub CPU 121*a* or 121*b* can execute programs referring to this information.

A hardware configuration capable of changing a part of determination values of the comparator 132 for level determination according to vehicle types is used and this level determination value is transferred.

There is provided selection switching information to make a part of programs, stored in the second nonvolatile memory 122*a* or 122*b*, be valid or invalid according to vehicle types.

Runaway determination information of the main CPU 111 is transferred.

On the other hand, it can be constructed that flash memory capable of being written from the external tool 106 is used as the second nonvolatile memory 122*a* or 122*b* of the sub CPU 121*a* or 121*b* side, and that control programs for input/output processing and filter constants are written in this flash memory. In this case, the filter constants do not disappear in relation to an abnormal decrease in a battery voltage or an opening of a power terminal and thus, the need for sending the filter constants through the serial-parallel converters 116 or 126 is eliminated.

As described above, according to a first aspect of the invention, A vehicle-mounted electronic control apparatus comprising:

a main CPU including a first nonvolatile memory in which at least control programs and control constants, in correspondence with types of controlled vehicles, transmitted from an external tool are written, the main CPU including a first RAM for calculation processing;

a sub CPU including a second nonvolatile memory in which programs for input/output processing are written and a second RAM for calculation processing; and a serial-parallel converter for serial communication adapted to transmit a plurality of input signals, which are input to the sub CPU, to the main CPU, wherein a plurality of filter constants corresponding to the plurality of input signals are stored in at least one of the first and second nonvolatile memory; and the sub CPU has a digital filter section adapted to perform predetermined calculation based on the filter constants to transmit a result of the calculation to the main CPU. Accordingly, the number of input/output pins of the main CPU is remarkably reduced to be compact and cheap. Since the need for using large capacity capacitors with various capacities for an input filter is eliminated, there are effects capable of achieving miniaturization and standardization of input interface circuit parts.

Particularly, control of a digital filter is performed in the sub CPU side, so that a load of the main CPU is not increased and the miniaturization and standardization can be achieved by a share of functions of the main CPU and the sub CPU.

As a result of that, integration of circuits in vicinity of the sub CPU including the input/output interface circuit parts can be made. In this case, a remarkable effect capable of considerably miniaturizing the whole apparatus compared with conventional electronic control apparatus is provided.

Also, according to a second aspect of the invention, the serial-parallel converter for serial communication transmits a plurality of control output signals calculated by the main CPU to the sub CPU and the serial-parallel converter supplies the plurality of control output signals to an external load through an output interface circuit connected to a data bus of the sub CPU. Accordingly, there are effects capable of achieving miniaturization and standardization. Also, there is an effect capable of improving monitoring performance.

Also, according to a third aspect of the invention, the plurality of input signals input to the sub CPU are a plurality of analog signals input through a noise filter including at least positive and negative clip diodes and a capacitor with a small capacity. The plurality of analog signals are conducted digital conversion into a plurality of digital converted values through an A/D converter and a digital filter including a switched capacitor periodically charged and discharged by a change-over switch and a setting unit of a charge and discharge cycle. The digital filter section performs predetermined calculation using the digital converted values to transmit a result of the calculation to the main CPU. Accordingly, large-amplitude noise and high-frequency noise are eliminated by the clip diodes and the noise filter, which serve as an input interface circuit to the analog signal, to reduce a load of the sub CPU to multiple digital filter processing. The filter constants can also be set in correspondence with the types of the controlled vehicles and standardization with high degrees of freedom can be achieved.

Also, according to a fourth aspect of the invention, the plurality of input signals input to the sub CPU are a plurality of on-off signals input through a bleeder resistor with a low resistance acting as a load to an input switch, a noise filter including a series resistor with a high resistance and a capacitor with a small capacity, and a comparator for level determination having a hysteresis function. The digital filter section has an input confirmation section adapted to sample outputs from the comparator for level determination in a predetermined cycle to make an ON determination when positive results of the continuous plurality of sampling results are 50% or more and to make an OFF determination if the positive results of the continuous plurality of sampling results are less than 50%. Outputs of the input confirmation section are transmitted to the main CPU. Accordingly, high-frequency noise is eliminated by the noise filter and the comparator for level determination, which serve as an input interface circuit to the on-off signal, to reduce a load of the sub CPU to multiple digital filter processing. A capacitor for filter can also be miniaturized.

Also, according to a fifth aspect of the invention, the digital filter section comprises a setting section adapted to set at least one of a sampling cycle and the number of logical determination points of the comparator for level determination. Accordingly, the filter constants can be set in correspondence with the types of the controlled vehicles and standardization with high degrees of freedom can be achieved.

Also, according to a sixth aspect of the invention, a determination value to make the input confirmation section output an ON is variable in a range of proportion of the positive results in the plurality of sampling results from 50% to 100%. Accordingly, the filter constants can be set in correspondence with the types of the controlled vehicles and standardization with high degrees of freedom can be achieved.

Also, according to a seventh aspect of the invention, there are provided a retransmission determination section. The filter constants are constants, which are corresponding to types of controlled vehicles, written in the first nonvolatile memory of the main CPU. The filter constants are transferred to the second RAM of the sub CPU through the serial-parallel converter for serial communication. A sum check of setting constants including the filter constants used in the digital filter section of the sub CPU is performed in the sub CPU. When a check sum error occurs, the retransmission determination section again transfers the filter constants from the main CPU to the sub CPU. Accordingly, the second nonvolatile memory of the sub CPU side may store fixed control programs for input/output processing. Since the control programs and the control constants in correspondence with the types of the controlled vehicles are stored in the first nonvolatile memory of the main CPU side in a unified manner, communications between the external tool and the sub CPU are eliminated to simplify a system configuration.

Also, according to a eighth aspect of the invention, there are provided a transfer section adapted to transfer the filter constants to the first RAM;

a control constant correction section adapted to correct control constants including the filter constants stored in the first RAM; and a control constant transfer section adapted to transfer the corrected control constants to the second RAM of the sub CPU through the serial-parallel converter for serial communication. The filter constants are constants, which are corresponding to the types of controlled vehicles, written in the first nonvolatile memory of the main CPU. The control constants are used as setting constants of the digital filter section of the sub CPU. Accordingly, even when the main CPU operates during runs of the controlled vehicles, a change in a part of the filter constants or a batch change by specification of a scale factor can be made by the main CPU and optimization control of the filter constants can be performed.

Also, according to a ninth aspect of the invention, an input/output interface circuit for high-speed processing capable of inputting/outputting to the main CPU directly without intervention of the sub CPU is connected to a data bus of the main CPU. A signal input to the sub CPU through the input/output interface circuit is monitored by the sub CPU to transmit a monitor result to the main CPU. Accordingly, a proper function share can be made between the main CPU and the sub CPU, and also various input monitor control is enhanced in the sub CPU side and thus the vehicle-mounted electronic control apparatus with superior safety can be provided.

Also, according to a tenth aspect of the invention, there are provided a removable connector adapted to connect an external tool;

a serial communication interface adapted to connect the external tool to the main CPU; and a writing mode determination section adapted to respond to operations of a part of the plurality of input signals supplied to the sub CPU and to generate a writing control signal from the sub CPU based on programs stored in the second nonvolatile memory. The writing control signal is supplied to a writing control terminal of the main CPU to transfer and write the control programs and the control constants from the external tool to the first nonvolatile memory. Accordingly, trick operations or malfunctions can be prevented in comparison with an unit adapted to input a writing control input by a simple hidden switch, and also a writing control command can be generated by encryption operations of existing input switches without installing the extra hidden switch.

What is claimed is:

1. A vehicle-mounted electronic control apparatus comprising:

a main CPU including a first nonvolatile memory in which at least control programs and control constants, in correspondence with types of controlled vehicles, transmitted from an external tool are written, the main CPU including a first RAM for calculation processing;

a sub CPU including a second nonvolatile memory in which programs for input/output processing are written and a second RAM for calculation processing; and a serial-parallel converter for serial communication adapted to transmit a plurality of input signals, which are input to the sub CPU, to the main CPU, wherein a plurality of filter constants corresponding to the plurality of input signals are stored in at least one of the first and second nonvolatile memory; and the sub CPU has a digital filter section adapted to perform predetermined calculation based on the filter constants to transmit a result of the calculation to the main CPU.

2. The vehicle-mounted electronic control apparatus according to claim 1, wherein the serial-parallel converter for serial communication transmits a plurality of control output signals calculated by the main CPU to the sub CPU and the serial-parallel converter supplies the plurality of control output signals to an external load through an output interface circuit connected to a data bus of the sub CPU.

3. The vehicle-mounted electronic control apparatus according to claim 1, wherein the plurality of input signals input to the sub CPU are a plurality of analog signals input through a noise filter including at least positive and negative clip diodes and a capacitor with a small capacity;

the plurality of analog signals are conducted digital conversion into a plurality of digital converted values through an A/D converter and a digital filter including a switched capacitor periodically charged and discharged by a changeover switch and a setting unit of a charge and discharge cycle; and the digital filter section performs predetermined calculation using the digital converted values to transmit a result of the calculation to the main CPU.

4. The vehicle-mounted electronic control apparatus according to claim 1, wherein the plurality of input signals input to the sub CPU are a plurality of on-off signals input through a bleeder resistor with a low resistance acting as a load to an input switch, a noise filter including a series resistor with a high resistance and a capacitor with a small capacity, and a comparator for level determination having a hysteresis function;

the digital filter section has an input confirmation section adapted to sample outputs from the comparator for level determination in a predetermined cycle to make an ON determination when positive results of the continuous plurality of sampling results are 50% or more and to make an OFF determination if the positive results of the continuous plurality of sampling results are less than 50%; and outputs of the input confirmation section are transmitted to the main CPU.

5. The vehicle-mounted electronic control apparatus according to claim 4, wherein the digital filter section comprises a setting section adapted to set at least one of a sampling cycle and the number of logical determination points of the comparator for level determination.

6. The vehicle-mounted electronic control apparatus according to claim 4, wherein a determination value to make the input confirmation section output an ON is variable in a range of proportion of the positive results in the plurality of sampling results from 50% to 100%.

7. The vehicle-mounted electronic control apparatus according to claim 1, further comprising a retransmission determination section, wherein the filter constants are constants, which are corresponding to types of controlled vehicles, written in the first nonvolatile memory of the main CPU;

the filter constants are transferred to the second RAM of the sub CPU through the serial-parallel converter for serial communication;

a sum check of setting constants including the filter constants used in the digital filter section of the sub CPU is performed in the sub CPU;

when a check sum error occurs, the retransmission determination section again transfers the filter constants from the main CPU to the sub CPU.

8. The vehicle-mounted electronic control apparatus according to claim 1, further comprising:

a transfer section adapted to transfer the filter constants to the first RAM;

a control constant correction section adapted to correct control constants including the filter constants stored in the first RAM; and a control constant transfer section adapted to transfer the corrected control constants to the second RAM of the sub CPU through the serial-parallel converter for serial communication, wherein the filter constants are constants, which are corresponding to the types of controlled vehicles, written in the first nonvolatile memory of the main CPU; and the control constants are used as setting constants of the digital filter section of the sub CPU.

9. The vehicle-mounted electronic control apparatus according to claim 1, wherein an input/output interface circuit for high-speed processing capable of inputting/outputting to the main CPU directly without intervention of the sub CPU is connected to a data bus of the main CPU; and a signal input to the sub CPU through the input/output interface circuit is monitored by the sub CPU to transmit a monitor result to the main CPU.

10. The vehicle-mounted electronic control apparatus according to claim 1, further comprising:

a removable connector adapted to connect an external tool;

a serial communication interface adapted to connect the external tool to the main CPU; and a writing mode determination section adapted to respond to operations of a part of the plurality of input signals supplied to the sub CPU and to generate a writing control signal from the sub CPU based on programs stored in the second nonvolatile memory, wherein the writing control signal is supplied to a writing control terminal of the main CPU to transfer and write the control programs and the control constants from the external tool to the first nonvolatile memory.

* * * * *